(12) United States Patent
Anthony et al.

(10) Patent No.: US 7,407,619 B2
(45) Date of Patent: *Aug. 5, 2008

(54) METHOD FOR MAKING BICYCLE FRAME BY COMPOSITE MATERIAL

(75) Inventors: David Michael Anthony, Taichung (TW); Yu-Hsuan Chen, Taichung (TW)

(73) Assignee: Unitec Composite Technology Corp., Taichung (TW)

( * ) Notice: Subject to any disclaimer, the term of this patent is extended or adjusted under 35 U.S.C. 154(b) by 226 days.

This patent is subject to a terminal disclaimer.

(21) Appl. No.: 11/229,070

(22) Filed: Sep. 19, 2005

(65) Prior Publication Data
US 2007/0063383 A1  Mar. 22, 2007

(51) Int. Cl.
  *B29C 70/44* (2006.01)
  *B29D 12/00* (2006.01)
(52) U.S. Cl. ............... 264/516; 264/573; 264/103; 264/258
(58) Field of Classification Search ............ 264/516, 264/573, 103, 258
See application file for complete search history.

(56) References Cited

U.S. PATENT DOCUMENTS 5,368,804 A * 11/1994 Hwang et al. ............... 264/258

* cited by examiner

*Primary Examiner*—Suzanne E. McDowell
(74) *Attorney, Agent, or Firm*—Banger Shia

(57) ABSTRACT

A method for making bicycle frames includes a step of preparing initial parts by carbon-fiber sheets and inflatable bladders are inserted into the initial parts which are then arranged to a desired arrangement. The arranged parts are put in a mold which is heated under a certain pressure. The inflatable bladders are inflated by introducing air therein to push the carbon-fiber sheets against the inside of the mold. The carbon-fiber sheets are then solidified to form a front part of the bicycle frame. A rear part of the bicycle frame or the whole bicycle frame can also be made by the same method.

6 Claims, 10 Drawing Sheets

METHOD FOR MAKING BICYCLE FRAME BY COMPOSITE MATERIAL

FIELD OF THE INVENTION

The present invention relates to a method for making bicycle frames by composite material and the frames are light in weight and have strong structure.

BACKGROUND OF THE INVENTION

A conventional way to make bicycle frames by composed material such as carbon-fiber is first make the bicycle parts such as the head tube, the top tube, the down tube and the seat tube individually. These parts are made by carbon-fiber sheets which are overlapped with each other to form the desired shape. These carbon-fiber sheets are then heated under a certain pressure to become solid pieces. The individual parts are then connected with each other by using connection members to connect two or three parts together. However, the individual parts are stiff so that they are not able to be deformed when needed so that a gap between two respective ends to be connected could be too wide to well support the load applied to the two parts. Although these gaps are covered by the connection members, potential risks still exist. After a period of time of use, the connection members tend to be broken. Besides, the conventional method limits the bicycle frames to have few fixed shapes.

The present invention intends to provide a method for making bicycle frames by composite material and the shapes of the frames are set when the parts are in deformable and flexible status.

SUMMARY OF THE INVENTION

The present invention relates to a method for making bicycle frames and the method comprises a step of preparing initial parts by carbon-fiber sheets; a step of inserting inflatable bladders into the initial parts; a step of connecting the parts with each other; a step of putting the parts in a mold; a step of heating the mold and inflating the inflatable bladders, and a step of removing the mold.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
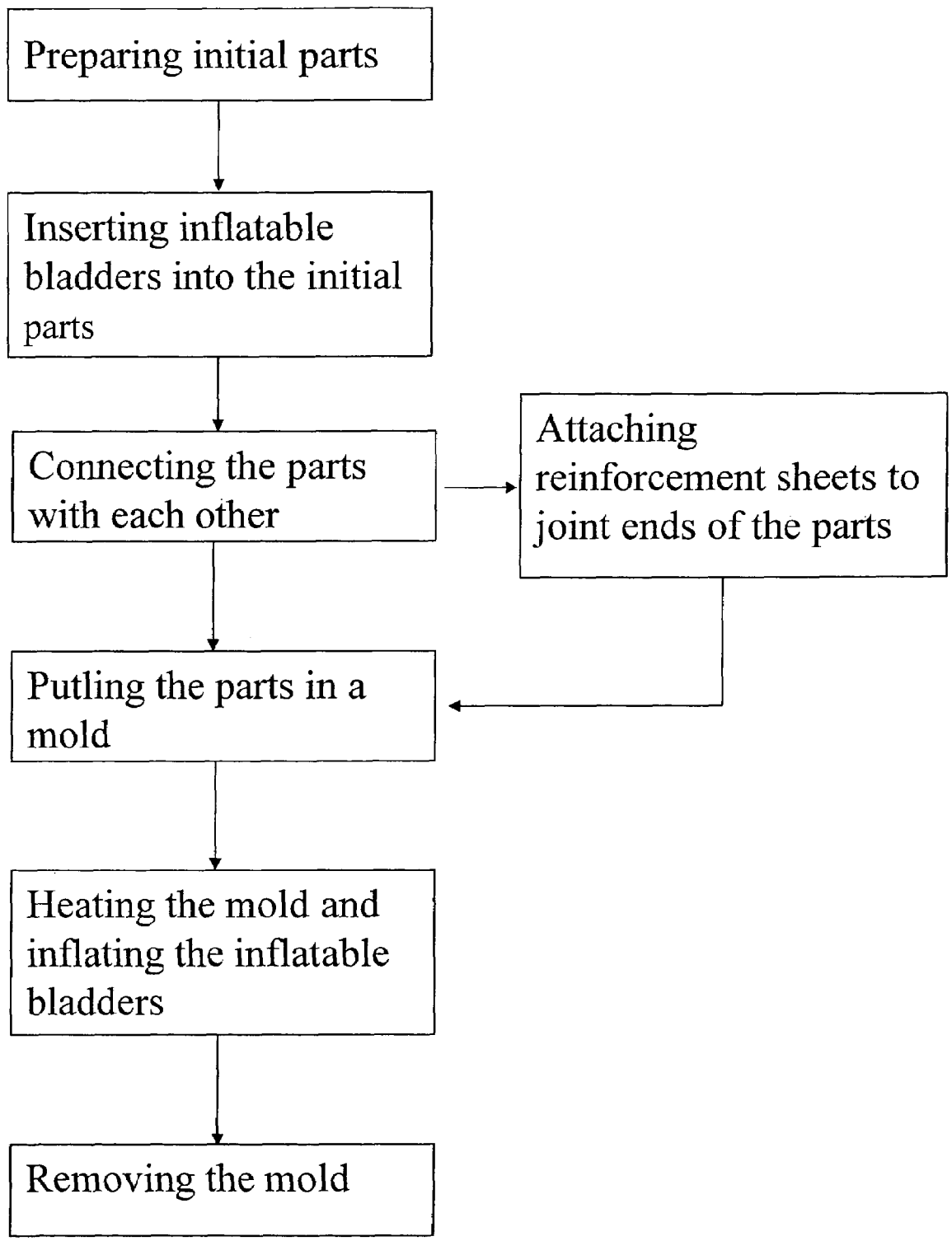
FIG. 1 shows steps of the method of the present invention.

Referring to FIG. 1, the method for making bicycle frames of the present invention comprises:

step 1: preparing initial parts by carbon-fiber sheets;
step 2: inserting inflatable bladders into the initial parts;
step 3: connecting the parts with each other;
step 4: putting the parts in a mold;
step 5: heating the mold and inflating the inflatable bladders, and
step 5: removing the mold.

Figure 2:
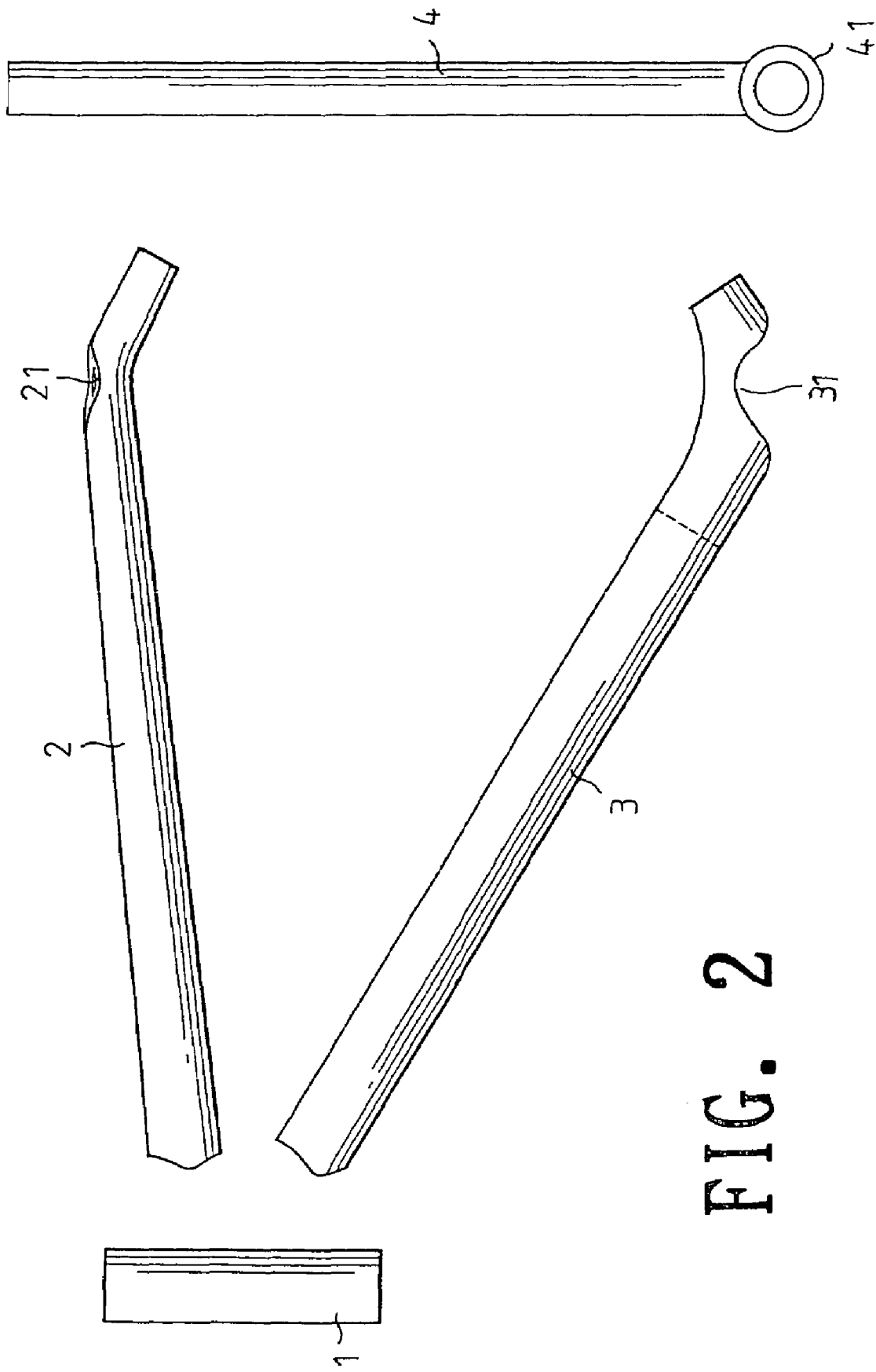
FIG. 2 is an exploded view to show the initial parts of the bicycle frame.
Figure 3:
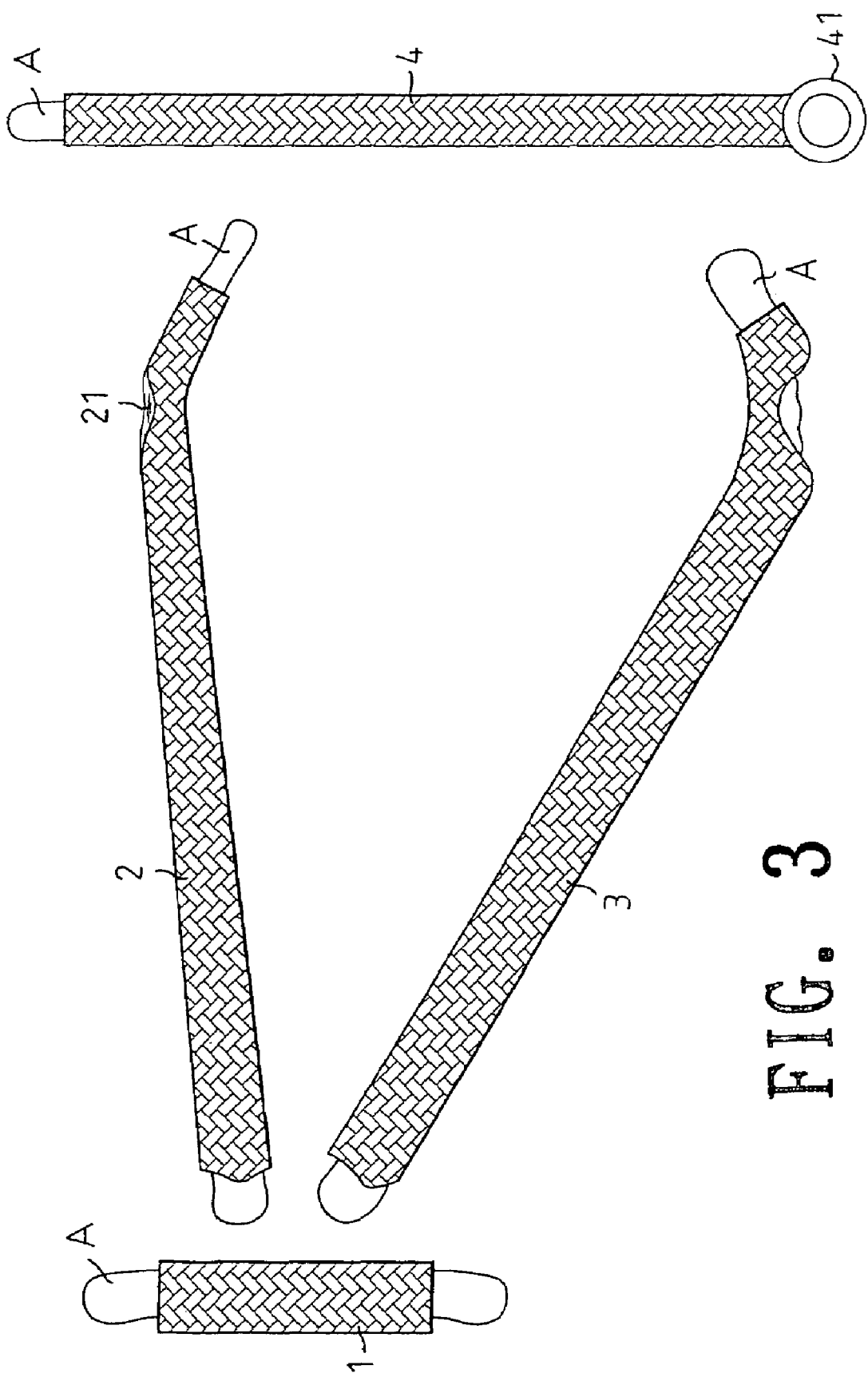
FIG. 3 shows each initial part has an inflatable bladder extending therethrough.
Figure 4B:
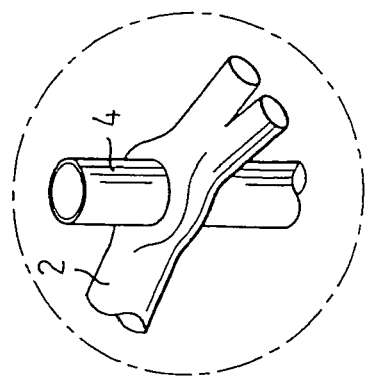
FIG. 4B shows the top tube includes a split end.
Figure 4C:
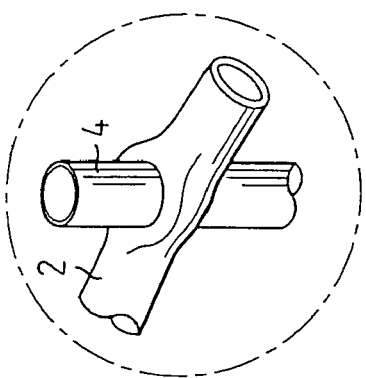
FIG. 4C shows the top tube does not have a split end.
Figure 4A:
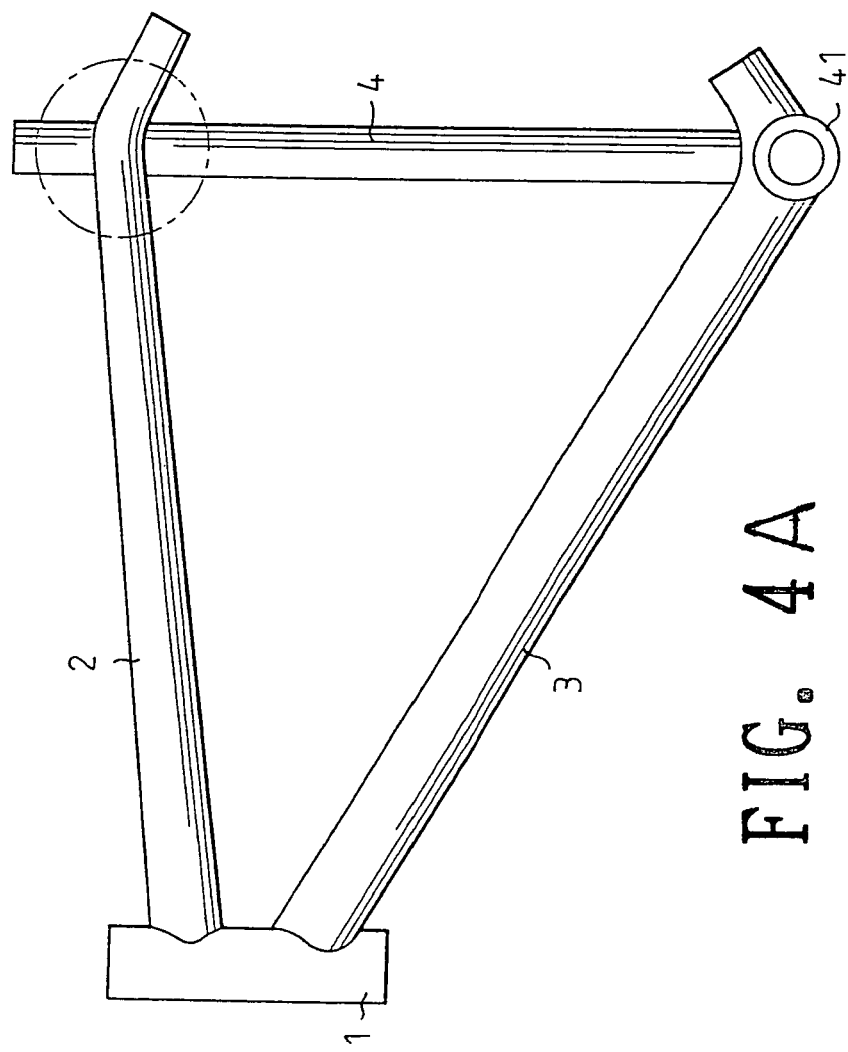
FIG. 4A shows the initial parts are arranged to connect with each other.

As shown in FIGS. 2, 3 and 4A, the bicycle frame in this embodiment includes the front part of the bicycle frame and the initial parts include a head tube 1, a top tube 2, a down tube 3 and a seat tube 4. The top tube 2 has a first hole 21 and the down tube 3 has a second hole 31 so that the seat tube 4 extends through the first and second holes 21, 31. The seat tube 4 has a bottom bracket 41 at an end thereof. The initial parts are made by carbon-fiber sheets which are wrapped to form the tubular parts. The inflatable bladders "A" are extended through the initial parts which are the head tube 1, the top tube 2, the down tube 3 and the seat tube 4.

Figure 5:
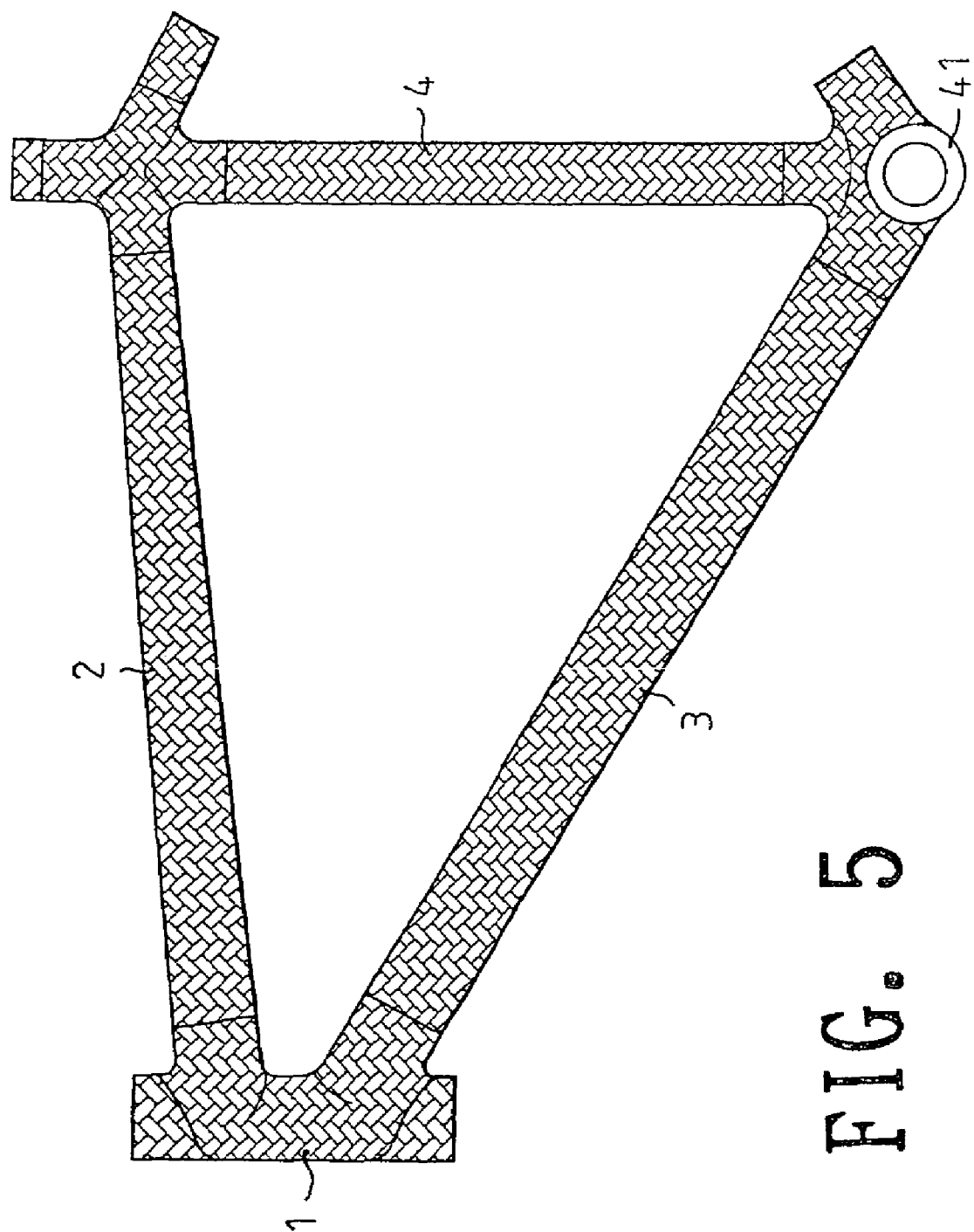
FIG. 5 shows reinforcement sheets are attached to joint ends of the parts in step 3.

The head tube 1, the top tube 2, the down tube 3 and the seat tube 4 are arranged to be connected with each other as shown in FIG. 4A. It is noted that the top tube 2 includes a first split end which is located close to the first hole 21. The down tube 3 may also include a second split end which is located close to the second hole 31 as disclosed in FIG. 6A. Reinforcement sheets can be attached to joint ends of the parts in step 3 when needed a shown in FIG. 5. The initial parts are then put into a mold "C".

Figure 6A:
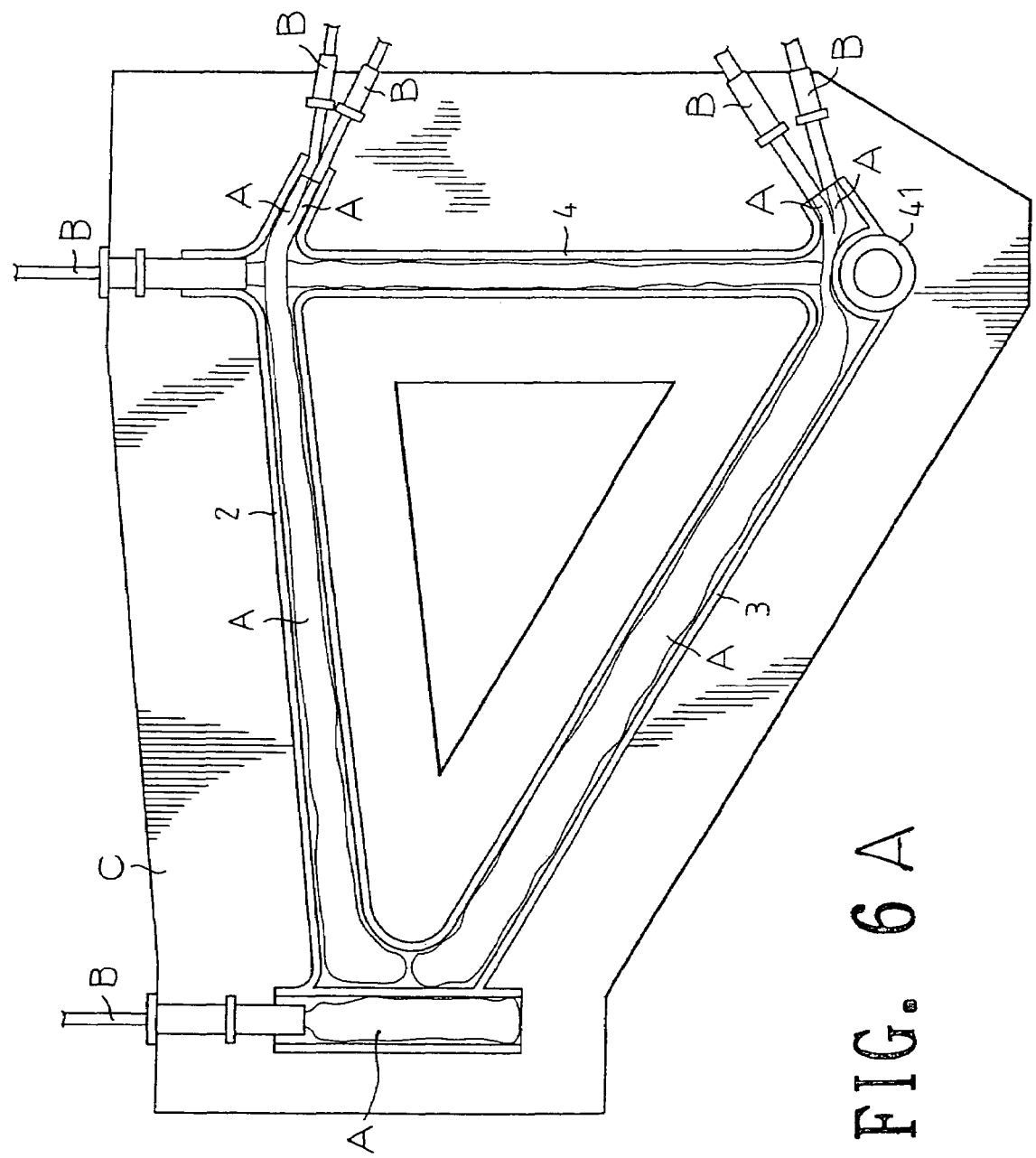
FIG. 6A shows a first way that the inflatable bladders extend through the initial parts.

As shown in FIG. 6A, a first inflatable bladder "A" extends through the head tube 1 and a second inflatable bladder "A" extends into the seat tube 4, a third inflatable bladder "A" extends through the top tube 2 and a fourth inflatable bladder "A" extends through the down tube 3. The third inflatable bladder "A" includes two first inlets which are respectively extended through the first split end of the top tube 2. The fourth inflatable bladder "A" extends through the down tube 3 and includes two second inlets which are respectively extended through the second split end of the down tube 3. Six nozzles "B" are required to respectively connected to the first and second inflatable bladders "A, and the first and second inlets.

Figure 6B:
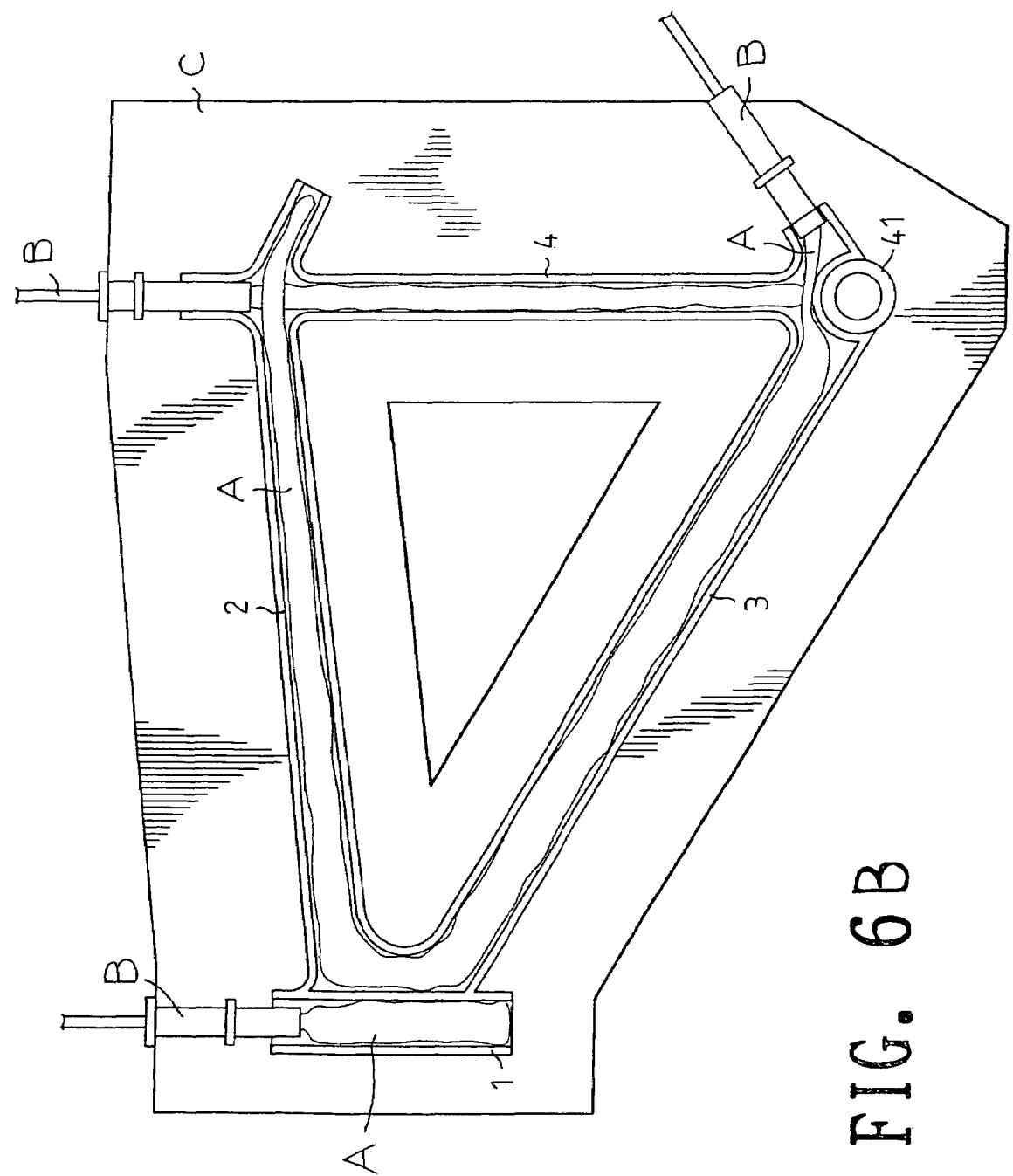
FIG. 6B shows a second way that the inflatable bladders extend through the initial parts.

As shown in FIG. 6B, a first inflatable bladder "A" extends through the head tube 1 and a second inflatable bladder "A" extends into the seat tube 4, a third inflatable bladder "A" extends through the top tube 2 and the down tube 3. Each inflatable bladder "A" is connected to a nozzle "B" so as to introduce air into the bladders "A".

Figure 6C:
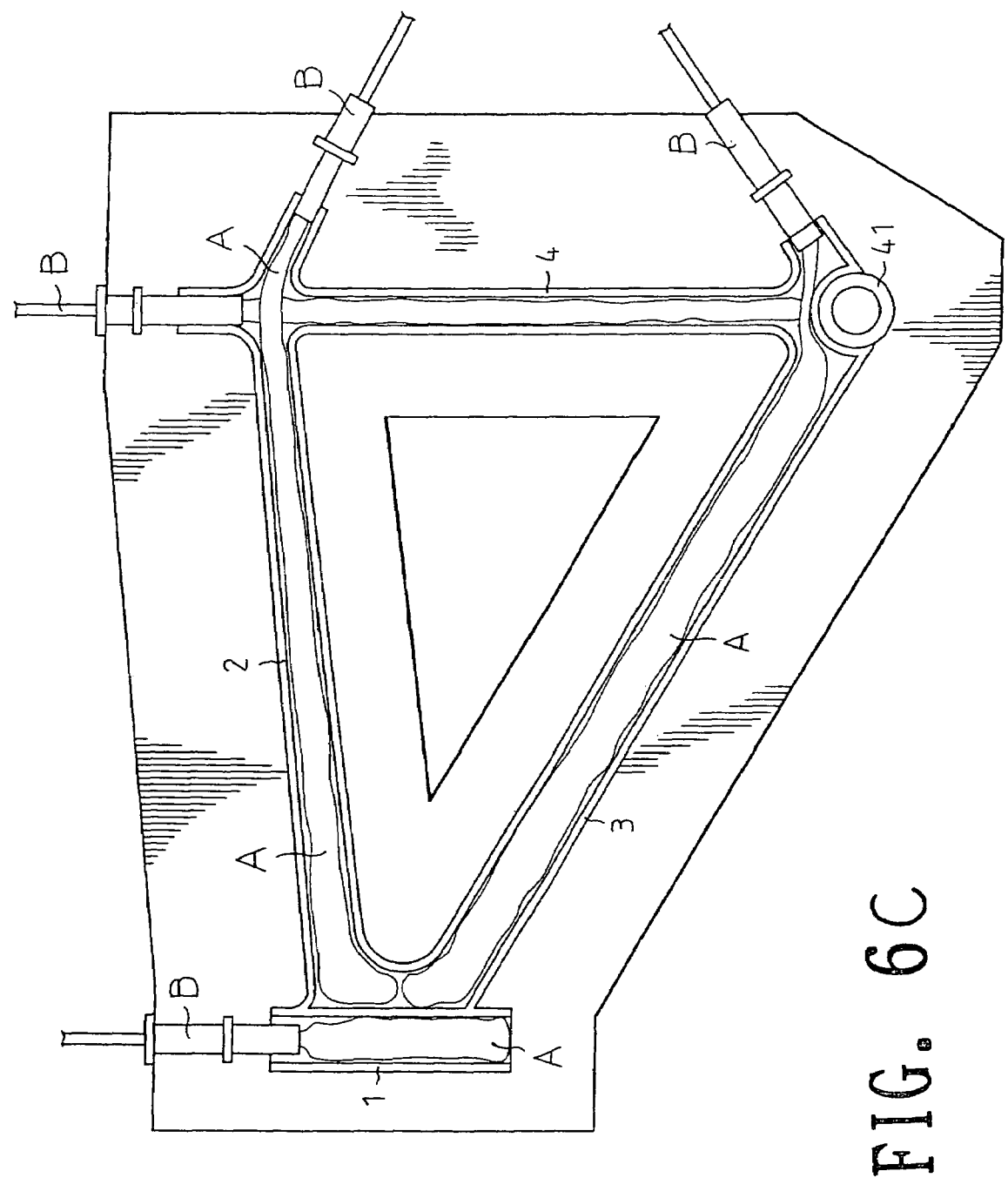
FIG. 6C shows a third way that the inflatable bladders extend through the initial parts.

As shown in FIG. 6C, a first inflatable bladder "A" extends through the head tube 1 and a second inflatable bladder "A" extends into the seat tube 4, a third inflatable bladder "A" extends through the top tube 2 and a fourth inflatable bladder "A" extends through the down tube 3. Four nozzles "B" are connected to the four inflatable bladders "A".

Figure 7:
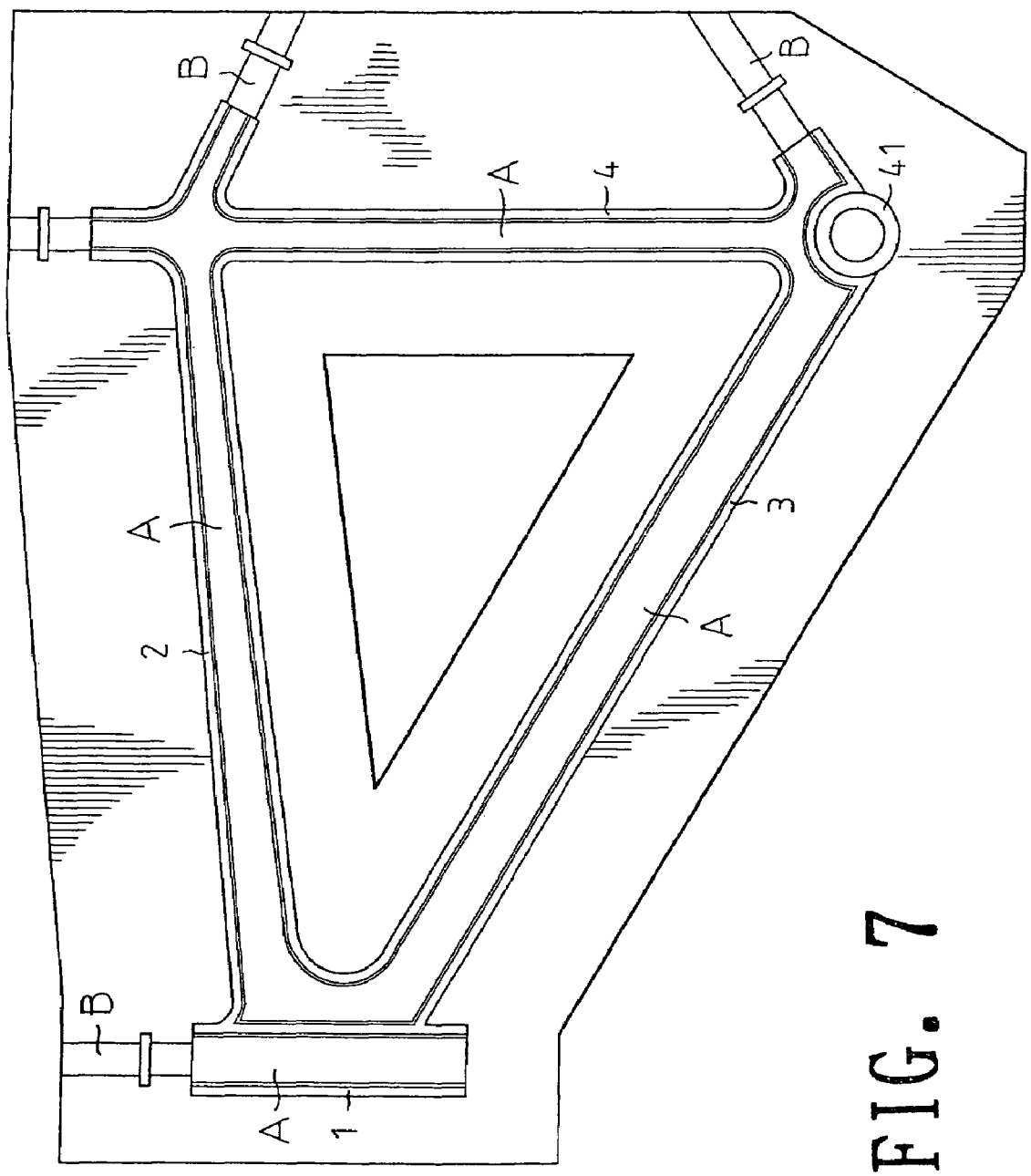
FIG. 7 shows that the inflatable bladders are inflated to push the carbon-fiber sheets against the mold.
Figure 8:
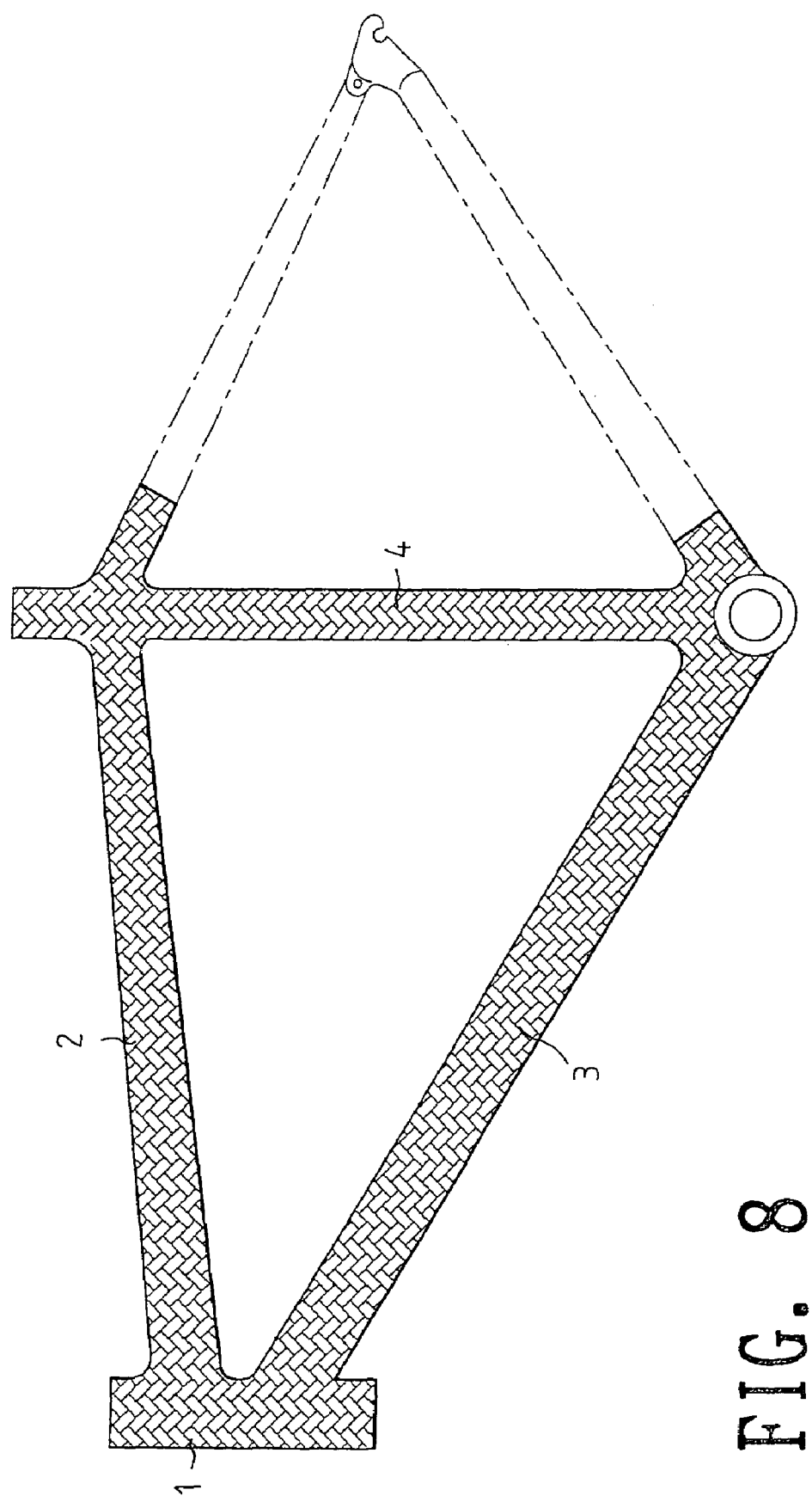
FIG. 8 shows the front part of the bicycle frame.

As shown in FIG. 7, the mold "C" is then heated under a certain pressure and the inflatable bladders "A" are inflated and push the carbon-fiber sheets on the initial parts against the inside of the concavities of the mold "C". When the carbon-fiber sheets are solidified and removing the mold "C", the front part of the bicycle frame is made as shown in FIG. 8. The rear part of the bicycle frame or the whole bicycle frame can also be made by this method.

While we have shown and described the embodiment in accordance with the present invention, it should be clear to those skilled in the art that further embodiments may be made without departing from the scope of the present invention.

What is claimed is:

1. A method for making bicycle frames, comprising:
    using carbon-fiber sheets to make a head tube, a seat tube, a top tube and a down tube so that the top tube and the down tube each comprise a hole for receiving the seat tube and that the seat tube comprises a bottom bracket at an end thereof;
    inserting inflatable bladders into the head tube, the seat tube, the top tube and the down tube;
    connecting the head tube, the seat tube, the top tube and the down tube to one another;
    putting the head tube, the seat tube, the top tube and the down tube in a mold;
    heating the mold and inflating the inflatable bladders, and removing the mold.

2. The method as claimed in claim 1, wherein the step of connecting the head tube, the seat tube, the top tube and the down tube to one another comprises the step of attaching reinforcement sheets are to joint ends of the head tube, the seat tube, the top tube and the down tube.

3. The method as claimed in claim 1, wherein the top tube includes a first split end which is located close to the first hole, and the down tube includes a second split end which is located close to the second hole.

4. The method as claimed in claim 3, wherein a first inflatable bladder extends through the head tube and a second inflatable bladder extends into the seat tube, a third inflatable bladder extends through the top tube and includes two first inlets which are respectively extended through the first split end of the top tube, a fourth inflatable bladder extends through the down tube and includes two second inlets which are respectively extended through the second split end of the down tube.

5. The method as claimed in claim 1, wherein a first inflatable bladder extends through the head tube and a second inflatable bladder extends into the seat tube, a third inflatable bladder extends through the top tube and the down tube.

6. The method as claimed in claim 1, wherein a first inflatable bladder extends through the head tube and a second inflatable bladder extends into the seat tube, a third inflatable bladder extends through the top tube and a fourth inflatable bladder extends through the down tube.

\* \* \* \* \*